United States Patent [19]

Landis et al.

[11] 4,324,816
[45] Apr. 13, 1982

[54] METHOD FOR FORMING A STRIPE BY EXTRUSION COATING

[75] Inventors: Newton C. M. Landis; Corrado Zollo, both of Rochester, N.Y.

[73] Assignee: Eastman Kodak Company, Rochester, N.Y.

[21] Appl. No.: 758,230

[22] Filed: Jan. 10, 1977

Related U.S. Application Data

[63] Continuation of Ser. No. 580,083, May 22, 1975, abandoned.

[51] Int. Cl.³ .................... B05D 5/12; B05D 3/02; B05C 3/02
[52] U.S. Cl. .................. 427/128; 118/407; 118/411; 118/412; 118/415; 427/130; 427/372.2; 430/140
[58] Field of Search .............. 427/128–132, 427/48, 372.2; 430/140; 118/407, 411, 412, 415

[56] References Cited

U.S. PATENT DOCUMENTS

| | | | |
|---|---|---|---|
| 2,551,329 | 5/1951 | Klemola | 91/12 |
| 2,569,755 | 10/1951 | Griffith | 117/31 |
| 2,715,088 | 1/1951 | Gunning | 154/93 |
| 2,774,327 | 12/1956 | Hilaire | 118/33 |
| 2,891,506 | 6/1959 | Hilaire | 118/415 |
| 3,062,181 | 11/1962 | Beguin | 118/407 |
| 3,551,201 | 12/1970 | Marchese et al. | 117/235 |
| 3,649,358 | 3/1972 | Johnston | 427/128 X |
| 3,681,138 | 8/1972 | Ankenbrand et al. | 117/238 |

FOREIGN PATENT DOCUMENTS 770540 10/1967 Canada .
813987 8/1959 United Kingdom .

OTHER PUBLICATIONS

Product Licensing Index, Nov. 71.

Primary Examiner—Michael R. Lusignan
Attorney, Agent, or Firm—A. P. Lorenzo

[57] ABSTRACT

Extrudable materials which exhibit a decrease in viscosity as the shear rate is increased, such as magnetic dispersion striping materials, are extrusion coated in the form of a narrow stripe. The stripe has predetermined uniform cross-sectional dimensions including substantially uniform thickness, and is coated onto a moving web by means of a die maintained in a predetermined spaced relation with the web. The die has two or more bores through which the extrudable material is extruded in columns onto the moving web to form the stripe thereon.

10 Claims, 4 Drawing Figures

METHOD FOR FORMING A STRIPE BY EXTRUSION COATING

This is a continuation of application Ser. No. 580,083, filed May 22, 1975, now abandoned.

BACKGROUND OF THE INVENTION

1. Field of the Invention

This invention relates to a method for extrusion coating on a moving web thin stripes of extrudable materials which exhibit a decrease in viscosity as the shear rate is increased. This includes materials whose flow properties can be characterized as pseudoplastic, thixotropic, or viscoelastic.

More particularly, the invention relates to extrusion coating thin stripes of such extrudable materials containing a large amount of particulate matter relative to the amount of binder present, as, for example, dispersions of magnetic materials used in magnetic recording media, high concentration phosphor dispersions in a binder, special photographic emulsions, etc.

2. Description of the Prior Art

Extrusion methods and apparatus for continuously forming and solidifying plastic materials into desired shapes are well known. After such extrusion the material is often reformed by mechanical means, such as drawing, punching, pressing, and machining.

One particular use to which extrusion techniques have been successfully applied is the coating of stripes of magnetic recording material on motion picture film. Such magnetic recording stripes preferably have uniform width and thickness within close tolerances to provide high quality sound recording and reproduction. For example, the magnetic recording stripe on 8 mm sound film preferably is between 25 mils (0.64 mm) and 29 mils (0.74 mm) wide and has a thickness of less than 0.45 mils (0.011 mm). The coating must have a high degree of uniformity to insure good contact of the magnetic recording material with the recording head. Such film also preferably has a balance stripe having the same uniform thickness as the recording stripe located on the same surface of the film as the recording stripe but adjacent to the opposite edge of the film, to provide for uniform stacking of the film convolutions as the film is wound on a core. The balance stripe preferably is between 12 mils (0.30 mm) and 16 mils (0.41 mm) in width. Variations outside of these close tolerances in coating dimensions can detrimentally affect the quality of the sound recorded on such stripes, and can physically damage the film by partially clogging the film perforations or overlapping onto the picture area.

It is known that extrudable materials, such as magnetic dispersions, can be extruded using an extrusion nozzle having a jewel with a single circular exit throat. (See Product Licensing Index, November, 1971, Disclosure No. 9111.) Such a nozzle can be used to form a stripe with a width between 12 mils (0.30 mm) and 16 mils (0.41 mm) and a thickness between 0.35 mils (0.0089) and 0.45 mils (0.011 mm). However, it has not been possible using such an extrusion nozzle to produce satisfactory recording stripes for 8 mm film, because it has not been possible to obtain a recording stripe of sufficient width without simultaneously increasing the thickness of the stripe to unacceptable levels. In other words, a sufficiently high width/thickness ratio cannot be achieved.

Recording stripes and balance stripes which meet the above criteria have been satisfactorily coated from an extrusion apparatus which has a rectangular or substantially rectangular extrusion slot, based on the assumption that this was the best way of producing a rectangular shaped cross-section in the stripe. Apparatus such as this are described by Beguin, U.S. Pat. No. 3,062,181; Marchese et al., U.S. Pat. No. 3,551,201; and Ankenbrand et al., U.S. Pat. No. 3,681,138.

However, there are certain problems associated with the use of these apparatus. First, considerable expense is involved in producing such apparatus because the plates forming the four walls of the extrusion slot must be machined to extreme accuracy and must be able to resist wear from the abrasive action of dispersed particles. Second, considerable problems can arise in the use of these apparatus; for example, the extrusion apparatus described in the Beguin patent includes four machined plates held together by bolts and locating pins to define the rectangular extrusion orifice. Due to various fluid forces, extruded material having a rectangular configuration is somewhat unstable and tends to lose its profile and to disintegrate into droplets. To avoid such discontinuities and "wipe out" of the coating stream at low extrusion pressures or coating speeds, the orifice of such a rectangular extrusion channel must be located in close proximity to the film, for example within 1 mil (0.025 mm) to 2 mils (0.051 mm) of the film. The proximity of the orifice of the extrusion channel to the film can result in trapping of dirt particles around the extruder orifice, and interferes with the film at splices. In addition, the solvent and binder in the coating material tends to seep between the interfacing surfaces of the plates and onto the film surface. Such seepage disfigures and damages the film and changes the proportion of solvent and binder to dispersion particles. These difficulties in using such stripe coating apparatus have been overcome principally by the exercise of considerable care in maintenance and quality control inspection.

SUMMARY OF THE INVENTION

In accordance with the present invention, a stripe having predetermined uniform cross-sectional dimensions including substantially uniform thickness is formed on a moving web by extruding an extrudable material which exhibits a decrease in viscosity as the shear rate is increased. The material is extruded through a die having two or more bores of predetermined dimensions positioned in a predetermined spaced relation with the path of the web, forming two or more columns of the extrudable material of sufficient stability to bridge the space between the die and the web. After impinging on the web, the columns coalesce to form the desired stripe. The materials that can be extruded to form stripes using the method and apparatus of the invention are those non-Newtonian fluid materials which exhibit a decrease in viscosity as the shear rate is increased, particularly pseudoplastic, thixotropic, and viscoelastic materials. Pseudoplastic materials comprise the majority of non-Newtonian fluids, and include polymeric solutions or melts, and suspensions of particulates such as pigment and magnetic dispersions. Often the apparent viscosity of a pseudoplastic fluid material is described by the equation $$\mu a = K(-du/dr)^{n-1}$$

wherein $\mu a$ is the apparent viscosity; K is a constant for a particular fluid material; $-du/dr$ is the shear rate; and n is a constant for a particular fluid material over a particular range of shear rate, and has a value less than one. Low values for n indicate more pronounced non-Newtonian characteristics. The viscosity characteristics of thixotropic materials, as, for example, various paints and inks, are similar to those of pseudoplastic materials, except that in addition to being shear rate dependent, they are also time dependent. Under steady-state flow conditions, the viscosity of viscoelastic materials such as various polymeric liquids, is determined by the equations developed for pseudoplastic materials, such as the above equation for apparent viscosity. For a more detailed discussion, see *Perry's Chemical Engineers Handbook*, 4th Ed., 1963, pp. 5-35, 36 and Wilkinson, *Non-Newtonian Fluids*, 1960, pp. 1-11.

The invention and its advantages will become more apparent from the detailed description below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
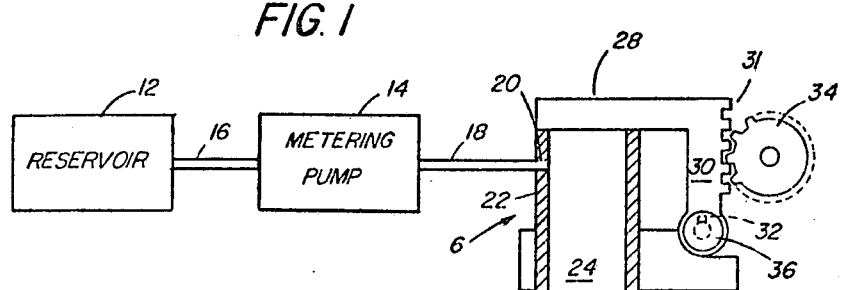
FIG. 1 is a schematic view, partially in block diagram form, of an extrusion apparatus according to a preferred embodiment of the invention.

An apparatus for extrusion coating a thin stripe of an extrudable material which exhibits a decrease in viscosity as the shear rate is increased, such as a magnetic dispersion striping material according to a preferred embodiment of the invention, is shown schematically in FIG. 1. The apparatus includes an extrusion hopper 6 adjustably mounted in operative relationship to a moving web, such as motion picture film 8 according to the preferred embodiment, moving in the direction of the arrows around a rotating mounted support drum 10.

A reservoir 12 is provided for supplying the magnetic dispersion striping material through a suitable metering pump 14 by way of supply pipes 16 and 18 to an inlet port 20 through wall 22 of the hopper 6. Although the hopper may take various configurations, it is illustrated as a generally cylindrical container defining a chamber 24, an inlet port 20, and an outlet port 26, which are described in greater detail with reference to FIG. 2. The hopper 6 may be mounted for adjustable movement relative to the path of the film 8 by any suitable means. As illustrated in FIG. 1, the hopper 6 is mounted on an arm 28 having an extension 30 defining two racks 31 and 32. The rack 31 is operatively associated with a pinion gear 34 such that rotation of the gear 34 adjusts the vertical position of the hopper with respect to the path of the film 8. The other rack 32 is operatively associated with a complementary screw 36, such that rotation of the screw controls movement of the hopper 6 laterally with respect to the path of the film 8 for determining the lateral position of the stripe on the film.

Figure 2:
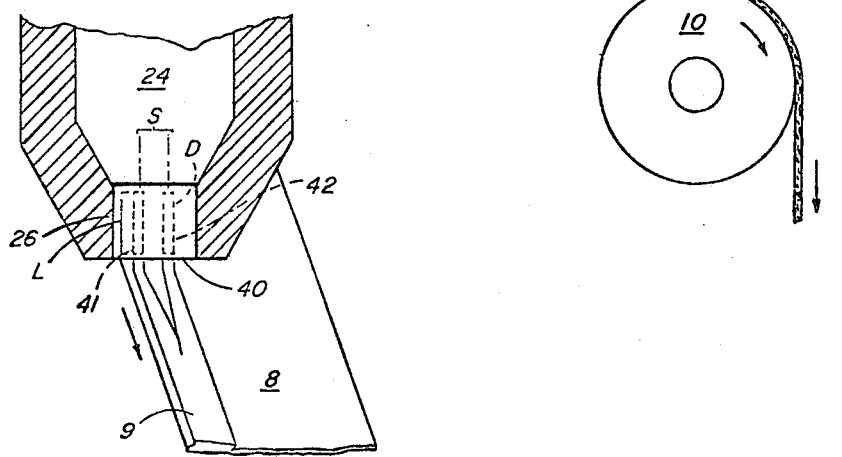
FIG. 2 is an enlarged view of a portion of the extrusion hopper and die shown in FIG. 1.

Referring now to FIG. 2, an enlarged cross-sectional partial view of the hopper during a striping operation is shown, including a portion of chamber 24 for receiving material supplied through the inlet port 20 of the hopper. The outlet port 26 of hopper 6 is illustrated in FIG. 2 as an opening in which is inset a die 40 having two bores 41 and 42 of generally cylindrical profile. Preferably the die is a jewel die, although other dies such as stainless steel, carbide steel, etc., may also be used. Cylindrical bores 41 and 42 both have diameters "D" and lengths "L"; the separation between the axes of the two cylindrical bores is represented by "S". The dimensions of the orifices are predetermined in accordance with the viscosity, cohesive, and adhesive properties of the particular magnetic dispersion striping material, the surface characteristics of the film, the extrusion pressure being used, the transport speed of the film, etc. In the preferred embodiment of the invention shown in FIG. 2, the two orifices are positioned such that the plane defined by the two bore axes and the line connecting them is perpendicular to the direction in which film 8 is traveling, which results in the maximum width/thickness ratio in resultant stripe 9 for a particular die.

The extrusion method and apparatus of the invention are particularly suitable for achieving the critical dimensional tolerances required for magnetic recording stripes and balance stripes on motion picture film because the viscosity of such materials during extrusion through the die is lower than the viscosity of the material on the film. Examples of such magnetic materials are disclosed in U.S. Pat. Nos. 3,220,843 and 3,243,376. The cohesiveness and surface tension properties of these materials is such that they tend to retain cylindrical profiles when extruded from cylindrical bores. After impinging on the film, the columns flow together to form a magnetic recording stripe or balance stripe having uniform cross-sectional dimensions and substantially uniform thickness. The separation between the two bores, and hence the separation between the two extruded columns, is predetermined in accordance with the "zero-shear" (static) viscosity of the material being extruded and the properties of the surface of the moving web. In contrast to the prior art extrusion nozzle using a single exit throat, by using a two-bore die, it is possible to prepare a stripe having a width of about 27 mils (0.69 mm) while simultaneously having a thickness of less than 0.45 mils (0.011 mm); such a stripe is suitable as a recording stripe for 8 mm film.

Figure 3:
FIG. 3 is an enlarged cross-section of a motion picture film showing a cross-section of a stripe of magnetic material prepared according to a preferred embodiment of the invention.

The final profile of such a magnetic stripe is indicated by reference to FIG. 3, showing a cross-sectional view of a portion of a film 8 having thereon a stripe 9 according to the invention. The edge portions 23 and 25 of stripe 9 taper downward to the film surface, but the stripe is substantially rectangular in shape, having a uniform width and uniform thickness over the portion of the width indicated by "W". The portion of a cross-section of a stripe having uniform thickness (W) that is achievable using the method and apparatus of the invention is over 90% of the total stripe width.

The use of a jewel material for the die provides a bore surface that is free of burrs and other physical defects, and its extremely smooth surface increases the stability of the extrusion profile. Stability is also enhanced when the jet is cylindrical as opposed to a jet with rectangular cross-section. Because of the smoothness of the bore and entry to the bore, jewel orifices are less susceptible than metal orifices to "plating out" of some dispersion components. The "plating out" effect can cause reduction of flow and narrowing of stripes.

Due to the stability of extruded columns of the materials described herein, the extrusion die can be located in a position displaced from the film by a sufficient amount to avoid the accumulation of dirt between the film and die and to permit passage of protrusions, for example, film splices. The length "L" of each die bore is preferably from 1 to 5 times its diameter "D" to provide sufficient distance to establish a stable jet profile of extruded material without requiring excessive extrusion pressure. Further, the use of such an integral die eliminates leakage of the striping material, such as had occurred in the practice of the aforementioned Beguin patent.

It is preferred but not essential that the bores of the die have a cylindrical profile. Although there is a tendency for an extruded column to assume the stable cylindrical configuration, in practice a column extruded from a non-cylindrical bore will usually impinge on the moving web before assuming a fully cylindrical configuration.

A die having two bores is generally satisfactory for the coating of narrow stripes such as the stripe that is applied to 8 mm film. However, for the coating of wider stripes the die can be provided with more than two bores. For example, a six-bore die could be used to coat the 100 mil stripe on 16 mm film.

Figure 4:
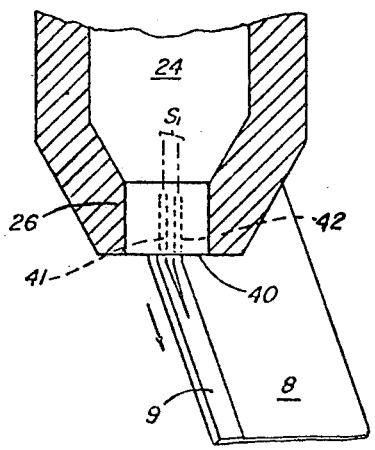
FIG. 4 indicates an alternative preferred embodiment of the invention in which the die is rotated to change the effective distance between the orifices.

The control over the dimensions of a stripe that can be achieved in the practice of the invention is indicated by the data in Table I. It is seen that the dimensions of a stripe of a particular material on a particular film can be accurately controlled by using dies having different distances between the axes of the bores and/or changing the transport speed of the film.

for the width/thickness ratio can also be altered by the embodiment of the invention shown in FIG. 4. In FIG. 4, it is seen that instead of changing dies to change the distance "S" between the axes of the cylindrical bores, an alternative is to rotate the same die so that the distance between a first plane defined by the axis of one of the bores and the axis defined by the direction of the film path and a second plane defined by the axis of the other bore and the axis defined by the direction of the film path can be varied by rotating the die to the desired degree. This creates a variable effective separation "$S_1$" between the axes of the cylindrical bores. For a particular die used in the practice of the invention, it is seen that "$S_1$" will be equal to "S" when the plane defined by the axes of the cylindrical bores and the line connecting them is perpendicular to the direction of the film path, and that "$S_1$" can be decreased from its maximum value "S" for each particular die by varying the degree of rotation.

The invention has been described in detail with particular reference to preferred embodiments that are particularly applicable to coating of magnetic stripes on sound and motion picture film, but it will be understood that variations and modifications can be effected within the spirit and scope of the invention as described hereinabove.

What is claimed is:

1. A method for extrusion coating on a web a magnetic dispersion striping material in a stripe which has a high width to thickness ratio and is of predetermined uniform cross-sectional dimensions, including substantially uniform thickness, which method comprises the steps of:

moving said web along a predetermined path;
extruding said magnetic dispersion striping material through a die located above the path of the web having at least two bores of predetermined dimen-

TABLE I

| Space Between Axes of Orifices "s" | *Film Type | Transport Speed | Stripe Width | Stripe Thickness | Width/Thickness |
|---|---|---|---|---|---|
| 14 mils (0.36 mm) | A | 400 ft./min. (122 m/min) | 27.5 mils (0.70 mm) | 0.31 mils (.0079 mm) | 89 |
| 14 mils (0.36 mm) | A | 600 ft./min. (183 m/min) | 26.0 mils (0.66 mm) | 0.21 mils (.0053 mm) | 124 |
| 9 mils (0.23 mm) | A | 400 ft./min. (122 m/min) | 26.5 mils (0.67 mm) | 0.47 mils (0.0119 mm) | 56 |
| 9 mils (0.23 mm) | A | 600 ft./min. (183 m/min) | 23.0 mils (0.58 mm) | 0.36 mils (.0091 mm) | |
| 14 mils (0.36 mm) | B | 400 ft./min. (122 m/min) | 29.0 mils (0.74 mm) | 0.41 mils (.0104 mm) | 71 |
| 14 mils (0.36 mm) | B | 600 ft./min. (183 m/min) | 29.0 mils (0.74 mm) | 0.41 mils (.0104 mm) | 71 |

*"A" represent EASTMAN EKTACHROME Commercial Film
"B" represents EASTMAN Color Print Film To form a suitable magnetic recording stripe on an 8 mm film, for instance, preferably the die is displaced from the film by a distance of 25 mils (0.64 mm) to 60 mils (1.52 mm). The diameter of the orifices preferably is 4.5 mil (0.11 mm) ±0.5 mil (0.013 mm). The length of the bores is preferably about 25 mils (0.64 mm); and preferably the distance between the axes of the cylindrical bores is about 12 mils (0.30 mm).

Although the width of stripe for a particular striping material or the maintaining of a constant stripe width for different striping materials can be achieved by using dies having varying dimensional differences in bore diameter and/or the distance "S" between the axes of the cylindrical bores, it is not always necessary to do so, sions positioned in a predetermined spaced relation with the path of the web to form columns of the extruded material which extend perpendicularly to the path of the web and are of sufficient stability to bridge the space between the die and the web; and
impinging the extruded columns of material on the moving web; the size and spacing of said bores, the space between said die and said web, and the speed at which said web is moved being so selected that said extruded columns of material coalesce after impinging on said web into a stripe of uniform cross-sectional dimensions, including substantially uniform thickness, having a high width to thickness ratio.

2. The method of claim 1 wherein the bores and the extruded columns of material have cylindrical profiles.

3. A method for extrusion coating on a photographic film a magnetic dispersion striping material in a stripe which has a high width to thickness ratio and is of predetermined uniform cross-sectional dimensions including substantially uniform thickness, which method comprises the steps of:

moving the film along a predetermined path;

feeding under pressure into a hopper chamber the magnetic dispersion striping material;

extruding the magnetic dispersion striping material in the hopper chamber through a die located above the path of the film having two bores of predetermined dimensions positioned in a predetermined spaced relation with the path of the film to form two columns of the magnetic dispersion striping material which extend perpendicularly to the path of the film and are of sufficient stability to bridge the space between the die and the film; and impinging the extruded columns of material on the moving film; the size and spacing of said bores, the space between said die and said film; and the speed at which said film is moved being so selected that said extruded columns of material coalesce after impinging on said film into a stripe of uniform cross-sectional dimensions, including substantially uniform thickness, having a high width to thickness ratio.

4. The method of claim 3 wherein the space between the die and the film is between 25 mils and 60 mils.

5. The method of claim 3 wherein the die is a jewel die.

6. The method of claim 3 wherein the bores and the extruded columns of material have cylindrical profiles.

7. The method of claim 6 wherein the length of each die bore is from one to five times its diameter.

8. A method for coating a thixotropic high viscosity liquid coating composition on a travelling web at a narrow width through an extrusion type hopper, comprising discharging the coating liquid from the hopper onto the travelling web through at least two coating liquid discharge ports arranged side by side in the direction of the width of the web so that the adjacent edges of the coating liquid discharge meet on the web, and drying the coated liquid within such time that a substantially flat cross sectional area results.

9. The method of claim 8, wherein said travelling web is photographic film and said coating composition comprises a magnetic recording layer coating composition.

10. The method of claim 8, wherein the viscosity of the coating layer ranges from about 100 to 8000 cp.

* * * * *